3,812,118
2(1H)-QUINAZOLINONES BY REACTION OF 2-CARBAMOYLINDOLES WITH HALOGEN

Michihiro Yamamoto, Nishinomiya, Shigeaki Morooka, Masao Koshiba, and Shigeho Inaba, Takarazuka, and Hisao Yamamoto, Nishinomiya, Japan, assignors to Sumitomo Chemical Company, Limited, Osaka, Japan
No Drawing. Filed June 5, 1972, Ser. No. 259,691
Claims priority, application Japan, Oct. 26, 1971, 46/84,861
Int. Cl. C07d 51/48
U.S. Cl. 260—247.1                     2 Claims

ABSTRACT OF THE DISCLOSURE

2(1H)-quinazolinone derivatives are obtained by treating a 2-carbamoylindole derivative with a halogen in the presence of an alkyli. The quinazolinone derivatives have excellent pharmacological actions such as anti-inflammatory, analgesic, uricosuric, diuretic and antiviral actions.

---

This invention relates to a novel process for preparing quinazolinone derivatives.

More particularly, the invention pertains to a novel process for preparing 2(1H)-quinazolinone derivatives represented by the formula.

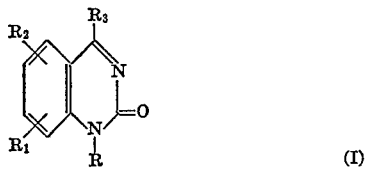

wherein $R_1$ and $R_2$ are individually a hydrogen atom, a lower alkyl group, a lower alkoxy group, a nitro group, a trifluoromethyl group, a lower alkylthio group, a lower alkylsulfonyl group or a halogen atom; $R_3$ is a phenyl group, a halophenyl group, a lower alkoxyphenyl group, a lower alkylphenyl group, a cycloalkyl group, a pyridyl group, a furyl group or a thienyl group; and R is a lower alkyl group, a lower alkenyl group, a cycloalkyl group, a lower alkoxyalkyl group, a lower alkylthioalkyl group, a lower polyhaloalkyl group, a lower hydroxyalkyl group, a group of the formula

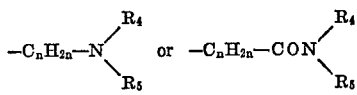

(wherein $n$ is an integer of 1 to 3; and $R_4$ and $R_5$ are individually a lower alkyl group, but may form together with the adjacent nitrogen atom, an unsubstituted or lower alkyl substituted 5- or 6 - membered saturated heterocyclic ring, which may contain another nitrogen or oxygen atom) or a group of the formula —$C_nH_{2n}$—$R_6$ (wherein $n$ is an integer of 1 to 3; and $R_6$ is a phenyl group, a halophenyl group, a lower alkylphenyl group, a lower alkoxyphenyl group, a nitrophenyl group, a cycloalkyl group, a pyridyl group, a furyl group, a thienyl group, a tetrahydrofuryl group or a tetrahydropyranyl group).

In the compounds represented by the general formula (I), the term "alkyl" means both straight and branched chain aliphatic hydrocarbon radicals, and the lower alkyl group includes for example, methyl, ethyl, n-propyl, isopropyl, n-butyl, isobutyl and tertiarybutyl groups; the lower alkoxy group includes, for example, methoxy, ethoxy, n-propoxy, isopropoxy,n-butoxy and tertiarybutoxy groups; the lower alkylthio group includes, for example, methylthio, ethylthio, isopropylthio and butylthio groups; the term "halogen" comprehends all halogens (e.g. fluorine, chlorine, bromine and iodine); the cycloalkyl group includes, for example, cyclopropyl, cyclobutyl, cyclopentyl, cyclohexyl, cycloheptyl and cyclooctyl groups; the lower alkenyl group includes, for example, vinyl, allyl, methallyl, butenyl and crotyl groups; the lower hydroxyalkyl group includes, for example, 2-hydroxyethyl, 3-hydroxypropyl and 2,3-dihydroxypropyl groups; and the polyhaloalkyl group includes, for example, 2,2,2 - trifluoroethyl, 2,2,2 - trichloroethyl, 2-chloro-2,2-difluoroethyl and 2,2,3,3,3 - pentafluoropropyl groups. The alkylene group represented by $C_nH_{2n}$ is a straight chain or branched chain alkylene group having 1 to 3 carbon atoms, and includes, for example, methylene, ethylene, 1-methylethylene, 2-methylethylene and trimethylene groups. $R_4$ and $R_5$ may form together with the adjacent nitrogen atom a saturated heterocyclic ring, and the heterocyclic group includes, for example, pyrrolidino, piperidino and morpholino groups and the lower alkyl substituted derivatives thereof.

The quinazoline derivatives of the formula (I) have excellent pharmacological properties, particularly as anti-inflammatory, analgesic, uricosuric, diuretic and anti-viral activities.

Thus the present invention offers a novel and useful process for producing commercially such valuable compounds.

As a process for preparing a 2(1H)-quinazolinone derivative from an indole derivative, there has been known a process carried out by oxidizing the indole derivative, hydrolyzing the resulting compound, and then reacting the hydrolyzate with cyanic acid or a salt thereof or alkyl carbamate (Canadian Pat. 892,593). According to the process of the present invention, however, a quinazoline derivative of the aforesaid formula (I) can be obtained by one step reaction from a 2-carbamoylindole derivative without adopting such complex steps as in the above-mentioned known process. Such process has not heretofore been described or suggested in any literature.

That is, quinazoline derivatives of the aforesaid formula (I) can be smoothly prepared by treating a 2-carbamoylindole derivative represented by the formula,

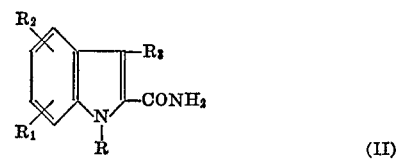

wherein $R_1$, $R_2$, $R_3$ and R are as defined previously, with bromine or chlorine in the presence of alkali, thereby bringing about an intramolecular rearrangement and ring expansion reaction of said derivative.

The reaction may be preferably carried out in an alkaline solution, using one quivalent or some excess amount of chlorine or bromine.

Examples of alkali used in the present invention include sodium hydroxide, potassium hydroxide, calcium hydroxide, barium hydroxide, sodium methoxide, sodium ethoxide, potassium methoxide, potassium ethoxide and the like. Examples of the solvent used in the present invention include water, methanol, ethanol, tetrahydrofuran, dioxane and the like, and a mixture thereof.

Generally, an excess of alkali is preferably used. The reaction may be effected at a temperature ranging from room temperature to the boiling point of the solvent used.

According to the process of the present invention, there are obtained, for example, the following quinazolinone derivatives:

1 - methyl-4-phenyl-5-chloro-2(1H)-quinazolinone, M.P. 259° C.

1 - methyl - 4-phenyl-6-iodo-2(1H)-quinazolinone, M.P. 247–248° C.
1 - methyl-4-(o-chlorophenyl)-6-chloro-2(1H)-quinazolinone, M.P. 198° C.
1-methyl-4-(o-tolyl)-6-chloro-2(1H)-quinazolinone, M.P. 212–213° C.
1-methyl-4-(p-methoxyphenyl)-6-chloro-2(1H)-quinazolinone, M.P. 214–215° C.
1-methyl-4-phenyl-6-methoxy-2(1H)-quinazolinone, M.P. 166° C.
1 - methyl - 4-phenyl-6-nitro-2(1H)-quinazolinone, M.P. 266–267° C.
1 - methyl - 4-phenyl-6-methylsulfonyl-2(1H)-quinazolinone, M.P. 238° C.
1 - methyl - 4-cyclohexyl-6-chloro-2(1H)-quinazolinone, M.P. 171–172° C.
1 - methyl - 4-(2-thienyl)-6-chloro-2(1H)-quinazolinone, M.P. 208° C.
1 - ethyl - 4-phenyl-6-methyl-2(1H)-quinazolinone, M.P. 180° C.
1 - ethyl - 4-phenyl-6-chloro-2(1H)-quinazolinone, M.P. 173–174° C.
1-ethyl-4-phenyl-6,7-dimethyl-2(1H)-quinazolinone, M.P. 176–178° C.
1-ethyl-4-phenyl-6-methyl-7-chloro-2(1H)-quinazolinone, M.P. 185–186°C.
1-ethyl-4-phenyl-6-methylthio-2(1H)-quinazolinone, M.P. 150–151° C.
1-ethyl-4-phenyl-6-nitro-2(1H)-quinazolinone, M.P. 216–217° C.
1-isopropyl-4-phenyl-2(1H)-quinazolinone, M.P. 140° C.
1-isopropyl-4-phenyl-6-chloro-2(1H)-quinazolinone, M.P. 138–139° C.
1-isopropyl-4-phenyl-7-methyl-2(1H)-quinazolinone, M.P. 140° C.
1-isopropyl-4-phenyl-6-nitro-2(1H)-quinazolinone, M.P. 194–195° C.
1-allyl-4-phenyl-6-chloro-2(1H)-quinazolinone, M.P. 182-183° C.
1-cyclohexyl-4-phenyl-6-nitro-2(1H)-quinazolinone, M.P. 186–187° C.
1-benzyl-4-phenyl-6-nitro-2(1H)-quinazolinone, M.P. 173–174° C.
1-(o-fluorobenzyl)-4-phenyl-6-chloro-2(1H)-quinazolinone, M.P. 145–146° C.
1-(o-methylbenzyl)-4-phenyl-6-nitro-2(1H)-quinazolinone, M.P. 200–201° C.
1-(p-nitrobenzyl)-4-phenyl-6-nitro-2(1H)-quinazolinone, M.P. 211–212° C.
1-(2-furfuryl)-4-phenyl-6-nitro-2(1H)-quinazolinone, M.P. 190 C.
1-(2-pyridylmethyl)-4-phenyl-6-nitro-2(1H)-quinazolinone, M.P. 176–178° C.
1-tetrahydrofurfuryl-4-phenyl-6-nitro-2(1H)-quinazolinone, M.P. 150° C.
1-cyclopropylmethyl-4-phenyl-6-chloro-2(1H)-quinazolinone, M.P. 174–175° C.
1-cyclopropylmethyl-4-phenyl-6-fluoro-2(1H)-quinazolinone, M.P. 168–169° C.
1-cyclopropylmethyl-4-phenyl-6-bromo-2(1H)-quinazolinone, M.P. 163–164° C.
1-cyclopropylmethyl-4-phenyl-8-chloro-2(1H)-quinazolinone, M.P. 163–164° C.
1-cyclopropylmethyl-4-phenyl-6,7-dichloro-2(1H)-quinazolinone, M.P. 206–207° C.
1-cyclopropylmethyl-4-phenyl-6,8-dichloro-2(1H)-quinazolinone, M.P. 158–159° C.
1-cyclopropylmethyl-4-phenyl-6-methyl-2(1H)-quinazolinone, M.P. 162–163° C.
1-cyclopropylmethyl-4-phenyl-6-methoxy-2(1H)-quinazolinone, M.P. 115–116° C.
1-cyclopropylmethyl-4-phenyl-6-nitro-2(1H)quinazolinone, M.P. 172–173° C.
1-cyclopropylmethyl-4-phenyl-6-trifluoromethyl-2(1H)-quinazolinone, M.P. 166–167° C.
1-cyclopropylmethyl-4-phenyl-6-methylthio-2(1H)-quinazolinone, M.P. 159–160° C.
1-cyclopropylmethyl-4-phenyl-6-methylsulfonyl-2(1H)-quinazolinone, M.P. 186–187° C.
1-cyclopropylmethyl-4-(m-chlorophenyl)-6-chloro-2(1H)-quinazolinone, M.P. 144–145° C.
1-cyclopropylmethyl-4-(p-methoxyphenyl)-6-chloro-2(1H)-quinazolinone, M.P. 169–170° C.
1-cyclopropylmethyl-4-cyclohexyl-6-chloro-2(1H)-quinazolinone, M.P. 156–157° C.
1-cyclopropylmethyl-4-(2-pyridyl)-6-chloro-2(1H)-quinazolinone, M.P. 120–121° C.
1-cyclopropylmethyl-4-(2-thienyl)-6-chloro-2(1H)-quinazolinone, M.P. 134–135° C.
1-cyclopropylmethyl-4-(2-furyl)-6-chloro-2(1H)-quinazolinone, M.P. 160–161° C.
1-cyclohexylmethyl-4-phenyl-6-chloro-2(1H)-quinazolinone, M.P. 224–225° C.
1-cyclohexylmethyl-4-phenyl-6-nitro-2(1H)-quinazolinone, M.P. 201–202° C.
1-cyclohexylethyl-4-phenyl-6-chloro-2(1H)-quinazolinone, M.P. 115–116° C.
1-cyclooctylmethyl-4-phenyl-6-nitro-2(1H)quinazolinone, M.P. 130–131° C.
1-methoxymethyl-4-phenyl-6-chloro-2(1H)-quinazolinone, M.P. 165–166° C.
1-ethoxymethyl-4-phenyl-6-nitro-2(1H)-quinazolinone, M.P. 162–163° C.
1-(2-ethoxyethyl)-4-(o-fluorophenyl)-6-chloro-2(1H)-quinazolinone, M.P. 151–152° C.
1-(2-ethoxyethyl)-4-phenyl-6-nitro-2-(1H)-quinazolinone, M.P. 128–129° C.
1-(2-methylthioethyl)-4-phenyl-6-nitro-2(1H)-quinazolinone, M.P. 140–141° C.
1-(3-chloropropyl)-4-phenyl-6-chloro-2(1H)-quinazolinone, M.P. 146–148° C.
1-(2,2,2-trifluoroethyl)-4-phenyl-6-chloro-2(1H)-quinazolinone, M.P. 185–186° C.
1-(2,2,2-trifluoroethyl)-4-phenyl-6-methoxy-2(1H)-quinazolinone, M.P. 157–158° C.
1-(2-hydroxyethyl)-4-phenyl-6-nitro-2(1H)-quinazolinone, M.P. 224–225° C.
1-(2-diethylaminoethyl)-4-phenyl-6-chloro-2(1H)-quinazolinone, M.P. 128–129° C.
1-(2-diethylaminoethyl)-4-phenyl-6-nitro-2(1H)-quinazolinone hydrochloride, M.P. 251–252° C. (decomposition)
1-(2-morpholinoethyl)-4-phenyl-6-nitro-2(1H)-quinazolinone, M.P. 80° C.
1-(N,N-diethylcarbamoylmethyl)-4-phenyl-6-nitro-2(1H)-quinazolinone, M.P. 150–151° C.

This invention is further disclosed in the following example of more preferred embodiment thereof, which is presented for the purpose of illustration and it is not intended to limit the scope of the invention.

EXAMPLE

To a solution of 6.7 g. of potassium hydroxide in 100 ml. of water was added dropwise with stirring 3.9 of bromine, while the mixture was maintained below 0° C. To the resultant mixture was added dropwise a solution of 5.7 g. of 1-methyl-3-phenyl-5-chloroindole-2-carboxamide in 100 ml. of tetrahydrofuran. Then, the mixture was heated under reflux for 3 hours. After cooling, the reaction mixture was extracted with chloroform, and the organic layer was washed successively with water, diluted hydrochloric acid and water and dried over anhydrous sodium sulfate. The solvent was removed under reduced pressure and the residue was chromatographed on silica gel using chloroform as an eluent to obtain 1-methyl-4-phenyl-6-chloro2(1H)-quinazolinone, which was recrystallized from ethanol to give pale yellow needles, M.P. 222–223° C.

Similarly by replacing bromine and potassium hydroxide of this example with chlorine and sodium hydroxide, there was produced 1-methyl-4-phenyl-6-chloro-2(1H)-quinazolinone.

What is claimed is:

1. A process for preparing quinazoline derivatives represented by the formula

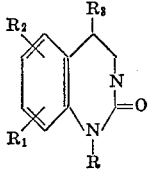

wherein $R_1$ and $R_2$ are individually a hydrogen atom, $C_1$–$C_4$ alkyl, $C_1$–$C_4$ alkoxy, nitro, trifluoromethyl, $C_1$–$C_4$ alkylthio, $C_1$–$C_4$ alkylsulfonyl, or a halogen atom; $R_3$ is phenyl, halophenyl, $C_1$–$C_4$ alkoxyphenyl, $C_1$–$C_4$ alkylphenyl, $C_3$–$C_8$ cycloalkyl, pyridyl, furyl or thienyl; and R is $C_1$–$C_4$ alkyl, $C_2$–$C_5$ alkenyl, $C_3$–$C_8$ cycloalkyl, $C_1$–$C_4$ alkoxy-$C_1$–$C_4$ alkyl, $C_1$–$C_4$ alkylthio-$C_1$–$C_4$ alkyl, polyhalo-$C_1$–$C_4$ alkyl, hydroxy-$C_1$–$C_4$ alkyl, a group of the formula

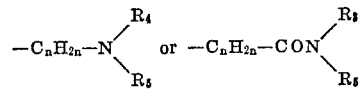

wherein $n$ is an integer of 1 to 3; and $R_4$ and $R_5$ are individually $C_1$–$C_4$ alkyl, but may form together with the adjacent nitrogen atom, morpholino or a group of the formula —$CnH_{2n}$—$R_6$ wherein $n$ is an integer of 1 to 3; and $R_6$ is phenyl, halophenyl, $C_1$–$C_4$ alkylphenyl, $C_1$–$C_4$ alkoxyphenyl, nitrophenyl, $C_3$–$C_8$ cycloalkyl, pyridyl, furyl, thienyl, tetrahydrofuryl or tetrahydropyranyl, which consists essentially of contacting a 2-carbamoylindole derivative represented by the formula,

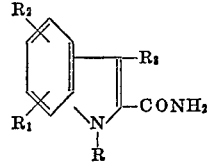

wherein $R_1$, $R_2$, $R_3$ and R are as defined above, with bromine or chlorine in a sodium or potassium hydroxide solution at a temperature of from room temperature to the boiling point of the solvent used.

2. A process according to claim 1, wherein the solvent used in the alkaline solution is water, methanol, ethanol, tetrahydrofuran, dioxane and a mixture thereof.

References Cited
UNITED STATES PATENTS
3,712,892   1/1973   Inaba et al. _____ 260—251 QB DONALD G. DAUS, Primary Examiner
R. V. RUSH, Assistant Examiner U.S. Cl. X.R.
260—247.2 A, 247.5 B, 251 QB, 256.4 Q, 256.5 R, 326.13 R; 424—248, 251

UNITED STATES PATENT OFFICE
CERTIFICATE OF CORRECTION

PATENT NO. : 3,812,118
DATED : May 21, 1974
INVENTOR(S) : Michihiro Yamamoto et al.

It is certified that error appears in the above—identified patent and that said Letters Patent are hereby corrected as shown below:

Claim 1, change the first formula to read

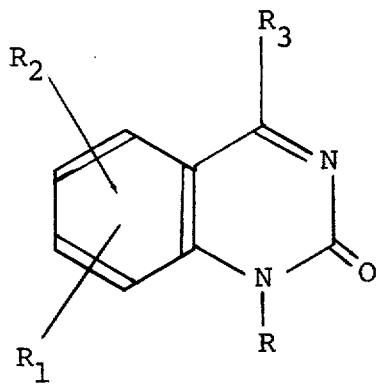

Signed and Sealed this sixteenth Day of March 1976

[SEAL]

Attest:

RUTH C. MASON
Attesting Officer

C. MARSHALL DANN
Commissioner of Patents and Trademarks